(12) United States Patent
Mori (10) Patent No.: US 9,986,125 B2
(45) Date of Patent: May 29, 2018

(54) INFORMATION PROCESSING APPARATUS, INFORMATION PROCESSING METHOD, AND OUTPUT SYSTEM FOR OUTPUTTING DATA

(71) Applicant: Shinya Mori, Kanagawa (JP)

(72) Inventor: Shinya Mori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/351,844

(22) Filed: Nov. 15, 2016

(65) Prior Publication Data

US 2017/0142284 A1 May 18, 2017

(30) Foreign Application Priority Data

Nov. 17, 2015 (JP) .................................. 2015-224996

(51) Int. Cl.
*H04N 1/32* (2006.01)
*G06K 9/00* (2006.01)
*H04N 1/00* (2006.01)

(52) U.S. Cl.
CPC ..... *H04N 1/32529* (2013.01); *G06K 9/00469* (2013.01); *H04N 1/00307* (2013.01); *G06K 2209/01* (2013.01); *H04N 2201/0094* (2013.01)

(58) Field of Classification Search
None
See application file for complete search history.

(56) References Cited

U.S. PATENT DOCUMENTS

| 2003/0011811 A1* | 1/2003 | Clough | G06F 3/1204 358/1.15 |
|---|---|---|---|
| 2010/0231949 A1 | 9/2010 | Mori | |
| 2013/0094049 A1 | 4/2013 | Mori | |
| 2015/0077793 A1 | 3/2015 | Mori | |
| 2015/0309759 A1 | 10/2015 | Mori | |
| 2016/0253128 A1 | 9/2016 | Mori | |

(Continued)

FOREIGN PATENT DOCUMENTS

| JP | 2013-008353 | 1/2013 |
|---|---|---|
| JP | 2014-146376 | 8/2014 |
| JP | 2015-056169 | 3/2015 |

(Continued)

*Primary Examiner* — Thomas D Lee
(74) *Attorney, Agent, or Firm* — Harness, Dickey, Pierce, P.L.C.

(57) ABSTRACT

An information processing apparatus is connected to output devices and includes a receiver, a selector, an output destination determiner, and an output data distributor. The receiver is configured to receive a request for outputting output data. The selector is configured to refer to correspondence information in which a condition that determines output device as an output destination of the output data and a validity period indicating a period during which the condition is available are associated for each of the output devices, and to select the condition whose validity period includes an output time point at which the output request is received, of the output data. The output destination determiner is configured to determine the output device as the output destination of the output data based on the selected condition and the output data. The output data distributor is configured to distribute the output data to the determined output device.

11 Claims, 8 Drawing Sheets

(56) References Cited

U.S. PATENT DOCUMENTS

2016/0274833 A1    9/2016   Mori
2016/0277540 A1    9/2016   Mori

FOREIGN PATENT DOCUMENTS

| | | |
|---|---|---|
| JP | 2015-087985 | 5/2015 |
| JP | 2015-215825 | 12/2015 |
| JP | 2016-170745 | 9/2016 |
| JP | 2016-177645 | 10/2016 |
| JP | 2017-027330 A | 2/2017 |

* cited by examiner

| ID | VALIDITY PERIOD | DEFAULT SCENARIO | SCENARIO | |
|---|---|---|---|---|
| 1 | 4/1/2015 TO 3/31/2016 | ○ | SCENARIO A | ← UNIT INFORMATION |
| 2 | 4/1/2016 TO 3/31/2017 | | SCENARIO B | ← UNIT INFORMATION |
| 3 | 4/1/2017 TO 3/31/2018 | | SCENARIO C | ← UNIT INFORMATION |

FIG.6A

SCENARIO A

| ID | RULE | KEYWORD | ACTION |
|----|------|---------|--------|
| 1 | OUTPUT TO "OUTPUT DEVICE 20A" WHEN "SURGICAL DEPARTMENT" IS EXTRACTED | "SURGICAL DEPARTMENT" | OUTPUT DESTINATION ASSIGNING ACTION OUTPUT DESTINATION: "OUTPUT DEVICE 20A" |
| 2 | OUTPUT TO "OUTPUT DEVICE 20B" WHEN "INTERNAL MEDICINE DEPARTMENT" IS EXTRACTED | "INTERNAL MEDICINE DEPARTMENT" | OUTPUT DESTINATION ASSIGNING ACTION OUTPUT DESTINATION: "OUTPUT DEVICE 20B" |
| 3 | OUTPUT TO "OUTPUT DEVICE 20C" WHEN "DEPARTMENT OF DIGESTIVE ORGANS" IS EXTRACTED | "DEPARTMENT OF DIGESTIVE ORGANS" | OUTPUT DESTINATION ASSIGNING ACTION OUTPUT DESTINATION: "OUTPUT DEVICE 20C" |

← UNIT INFORMATION (for each row)

FIG.6B

SCENARIO B

| ID | RULE | KEYWORD | ACTION |
|---|---|---|---|
| 1 | OUTPUT TO "OUTPUT DEVICE 20D" WHEN "SURGICAL DEPARTMENT" IS EXTRACTED | "SURGICAL DEPARTMENT" | OUTPUT DESTINATION ASSIGNING ACTION OUTPUT DESTINATION: "OUTPUT DEVICE 20D" |
| 2 | OUTPUT TO "OUTPUT DEVICE 20E" WHEN "INTERNAL MEDICINE DEPARTMENT" IS EXTRACTED | "INTERNAL MEDICINE DEPARTMENT" | OUTPUT DESTINATION ASSIGNING ACTION OUTPUT DESTINATION: "OUTPUT DEVICE 20E" |
| 3 | OUTPUT TO "OUTPUT DEVICE 20F" WHEN "DEPARTMENT OF DIGESTIVE ORGANS" IS EXTRACTED | "DEPARTMENT OF DIGESTIVE ORGANS" | OUTPUT DESTINATION ASSIGNING ACTION OUTPUT DESTINATION: "OUTPUT DEVICE 20F" |

← UNIT INFORMATION (for each row)

INFORMATION PROCESSING APPARATUS, INFORMATION PROCESSING METHOD, AND OUTPUT SYSTEM FOR OUTPUTTING DATA

CROSS-REFERENCE TO RELATED APPLICATION

The present application claims priority under 35 U.S.C. § 119 to Japanese Patent Application No. 2015-224996, filed Nov. 17, 2015. The contents of which are incorporated herein by reference in their entirety.

BACKGROUND OF THE INVENTION

1. Field of the Invention

The present invention relates to an information processing apparatus, an information processing method, and an output system.

2. Description of the Related Art

Conventionally, a technique of determining an output destination in accordance with information and the like extracted from output data such as print data and executing printing in an image forming device which is the determined output destination.

For example, Japanese Unexamined Patent Application Publication No. 2013-008353 discloses a technique of registering, to distribute print data to any one of a plurality of printers, a distribution condition that determines a correspondence relation between all users and the plurality of printers in advance and determining a printer to which a print job is to be transmitted based on user information extracted from the print job and the distribution condition registered in advance.

However, since there is no validity period for the distribution condition in the technique disclosed in Japanese Unexamined Patent Application Publication No. 2013-008353, it is necessary in changing the distribution condition to manually switch the condition. For example, in a case of assigning an output destination of output data in clinical practice, there is a situation where the distribution condition is required to be changed from a given date due to a change in laws and regulations. In this situation, it is necessary for a user to perform a manual switching at the time when the user wants to change the distribution condition.

SUMMARY OF THE INVENTION

According to one aspect of the present invention, an information processing apparatus is connected to a plurality of output devices and includes a receiver, a selector, an output destination determiner, and an output data distributor. The receiver is configured to receive a request for outputting output data. The selector is configured to refer to correspondence information in which a condition that determines output device as an output destination of the output data and a validity period indicating a period during which the condition is available are associated for each of the output devices, and to select the condition whose validity period includes an output time point at which the output request is received, of the output data. The output destination determiner is configured to determine the output device as the output destination of the output data based on the selected condition and the output data. The output data distributor is configured to distribute the output data to the determined output device.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide an information processing apparatus, an information processing method, and an output system capable of performing a switching to a desired condition in assigning an output destination of output data, without a manual switching, by a user, of the condition that determines an output destination of the output data.

While a print system will be taken as an example of an output system and explained below, the present invention is not limited thereto. Any output system in which output data is output by a printing, a projection, a display, and a transfer may be adopted as the output system to which the present invention is applied.

Figure 1:
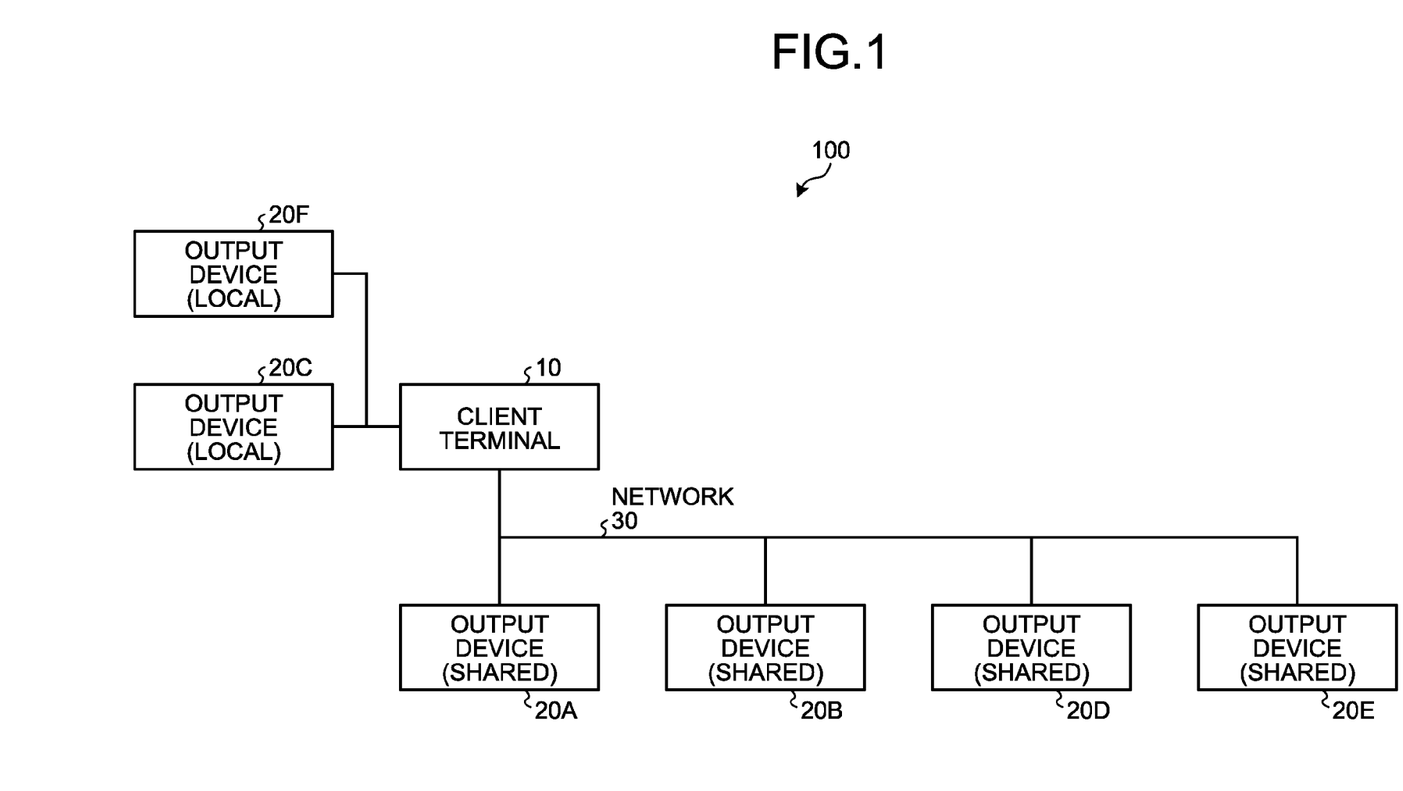
FIG. 1 illustrates an example of a simple overview of a configuration of a print system according to an embodiment.

FIG. 1 illustrates an example of a simple overview of a configuration of a print system according to an embodiment. As illustrated in FIG. 1, a print system 100 is provided with a client terminal 10, shared output devices 20A, 20B, 20D, and 20E, which are connected via a network 30 such as LAN.

The print system 100 is also provided with local output devices 20C and 20F, which are connected to the client terminal 10. In the explanation below, when the shared output devices 20A, 20B, 20D, and 20E and the local output devices 20C and 20F are not discriminated from each other, they are sometimes referred to simply as "output device 20".

While the print system 100 will be explained on the assumption of being built in a hospital below, the present invention is not limited thereto.

The client terminal 10 is an information processing apparatus such as a PC (Personal Computer) used by a user (a nurse, an office clerk, and the like in a hospital in this example). Here, the client terminal 10 is not limited to a form of a stationary type and may be a form of a portable type (a form of a smartphone and a tablet, for example). In this example, the client terminal 10 corresponds to "information processing apparatus" in the appended claims. More detailed content will be explained later. While FIG. 1 exemplifies a style in which the print system 100 is provided with one client terminal 10 for the convenience of explanation, the present invention is not limited thereto and the number of the client terminal 10 included in the print system 100 is arbitrary. For example, each of a plurality of users in a hospital may carry one client terminal 10.

The output device 20 is an image forming device such as a printer that forms an image on a sheet of recording paper. The shared output devices 20A, 20B, 20D, and 20E are image forming devices connected to the client terminal 10 via the network 30. The local output devices 20C and 20F are image forming devices directly connected to the client terminal 10 via a wired communication with cables or a wireless communication such as Bluetooth®. The output device 20 may be: an image forming device such as a printer, a copying machine, a multifunction peripheral (MFP), and a laser printer (LP); a projection device and a display device such as a projector and a monitor that execute a display output; and an audio output device that outputs audio data such as an audio sound. The number of the output devices 20 included in the print system 100 is arbitrary.

Figure 2:
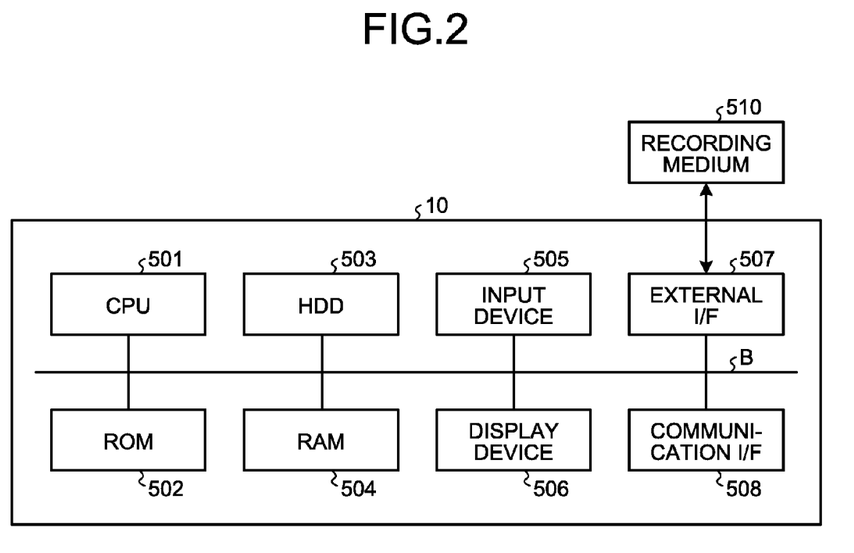
FIG. 2 illustrates an example of a hardware configuration of a client terminal according to the embodiment.

FIG. 2 illustrates an example of a hardware configuration of the client terminal according to the embodiment. As illustrated in FIG. 2, the client terminal 10 is provided with a CPU 501, a ROM 502, an HDD 503, a RAM 504, an input device 505, a display device 506, an external I/F 507, a communication I/F 508, and the like, which are mutually connected by a bus B.

The CPU 501 is an arithmetic device that reads out, from a storage device such as the ROM 502 and the HDD 503, programs and data on the RAM 504 and executes a processing to control the entirety of the client terminal 10 and realize various kinds of functions.

The ROM 502 is an example of a non-volatile semiconductor memory (storage device) capable of retaining programs and data even when a power source is turned off (even when a power supply to the client terminal 10 is blocked off). Programs and data for BIOS, OS settings, and network settings to be executed in the start-up of the client terminal 10 are stored in the ROM 502.

The HDD 503 is an example of a non-volatile storage device that stores programs and data. An OS as a basic software controlling the entirety of the client terminal 10, application software that provides various kinds of functions on the OS (hereinafter referred to simply as "application"), and the like are stored in the HDD 503. The client terminal 10 may use a drive device (an SSD, i.e., a solid state drive, for example) using a flash memory as a storage medium instead of the HDD 503.

The RAM 504, which is an example of a volatile storage device that temporarily stores programs and data, functions as a work area of a processing to be executed by the CPU 501.

The input device 505, which is a device used for inputting various kinds of operation signals by a user, can be configured by a keyset, a mouse, a touch-sensitive screen, and the like, for example. The display device 506, which is a device that displays information of various kinds (a result of the processing by the client terminal 10, for example), can be configured by a display device of a liquid crystal type, for example. Here, the input device 505 and the display device 506 may be configured integrally like a touch-sensitive screen, for example. Besides, the input device 505 and the display device 506 may be configured to be used by being connected when needed.

The external I/F 507 is an interface with an external device. While a recording medium 510 is taken as an example of the external device in the example of FIG. 2, the present invention is not limited thereto. The client terminal 10 is capable of reading data from the recording medium 510 and writing data with respect to the recording medium 510 via the external I/F 507. A flexible disk, a CD, a DVD, an SD memory card, a USB memory, and the like can be listed each as an example of the recording medium 510.

The communication I/F 508 is an interface that enables connecting the client terminal 10 to the network 30. The client terminal 10 can be connected to the network 30 via the communication I/F 508.

Figure 3:
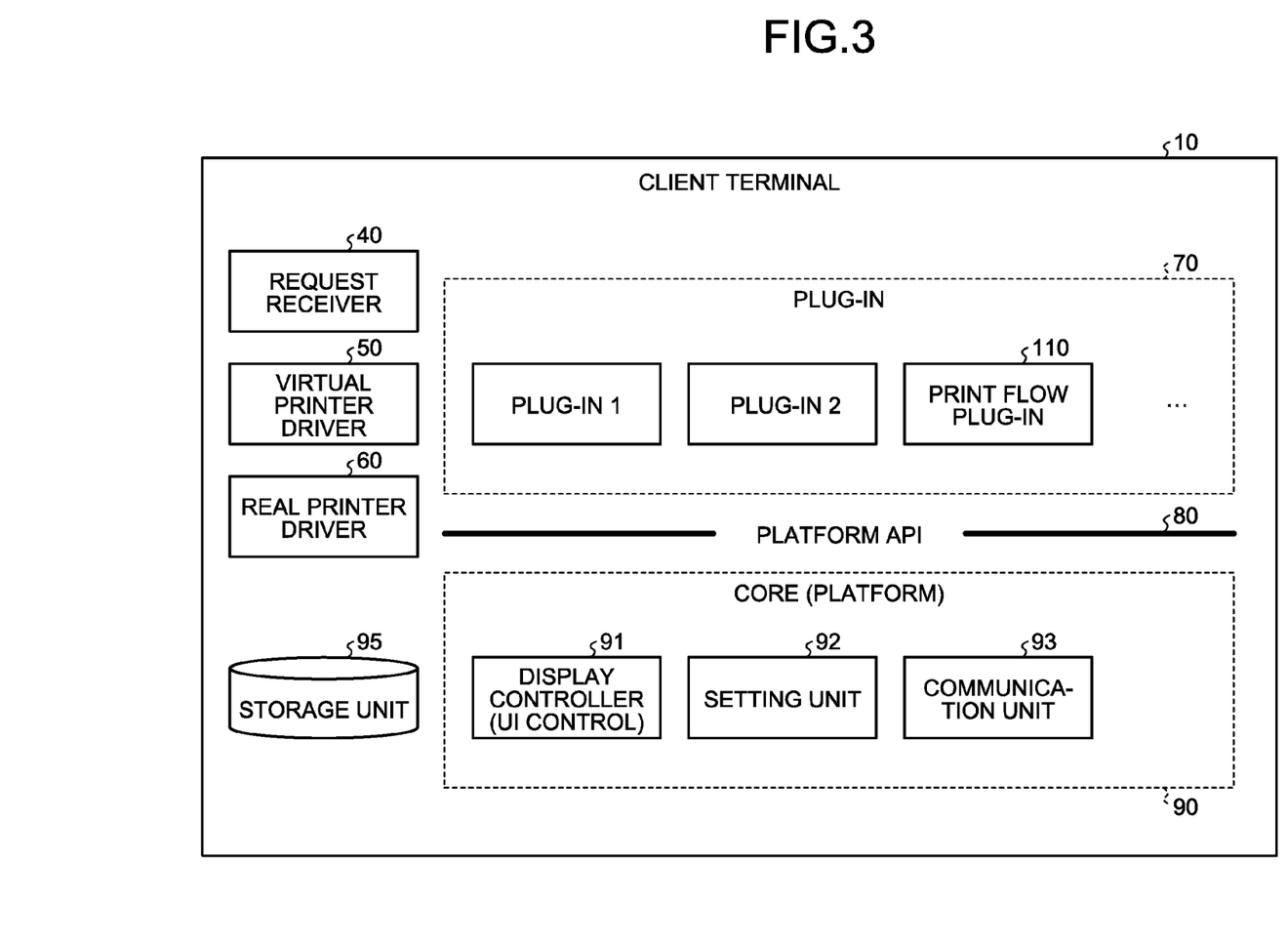
FIG. 3 illustrates an example of functions included in the client terminal according to the embodiment.

FIG. 3 illustrates an example of functions included in the client terminal according to the embodiment. When the CPU 501 of the client terminal 10 executes a program, a request receiver 40, a virtual printer driver 50, a real printer driver 60, a plug-in 70, a platform API 80, and a platform 90 are realized. A storage unit 95 illustrated in FIG. 3 can be realized by the ROM 502 and the HDD 503, for example.

The request receiver 40, which is a function to be provided by an application which is installed in the client terminal 10 in advance to create a document, creates print data of a document (an example of output data) and passes the print data to the virtual printer driver 50 when receiving a print request (output request) from a user. In creating the print data in the embodiment, a time and date of the creation is embedded as a print time and date of the print data at a specified position of the print data. For example, a print time and date like "Oct. 21, 2015/16:05" is embedded at an upper left area, which is the specified position of the print data, for example.

The virtual printer driver 50 converts the print data passed by the request receiver 40 into machine-independent intermediate print data and outputs the intermediate print data. The intermediate print data is print data independent on the machine model of the output device 20. The XPS (XML Paper Specification) etc. is taken as an example of the intermediate print data. Here, it can be considered that the intermediate print data is one mode of the print data and an example of the output data.

The real printer driver 60 converts the intermediate print data into real print data of a format by which the output device 20 can perform printing and outputs the real print data. Data of RAW format etc. can be taken as an example of the real print data.

The plug-in 70 is an application that operates on the platform 90. While the plug-in 70 includes a plug-in 1, a plug-in 2, and a print flow plug-in 110 in the example of FIG. 3, it is only necessary in the present embodiment that at least the print flow plug-in 110 is included. The print flow plug-in 110 determines the output device 20 as an output destination of the intermediate print data passed by the virtual printer driver 50 and uses the real printer driver 60 to perform a control of outputting the real print data from the output device 20 determined as the output destination. The specific content of the print flow plug-in 110 will be explained later.

The platform API 80 is an interface that allows the plug-in 70 to use the function of the platform 90. The platform API 80, which is an interface (pre-defined interface) provided so that the platform 90 receives a request from the plug-in 70, is configured by a function, a class, and the like, for example.

The platform 90 includes a display controller 91, a setting unit 92, and a communication unit 93. The display controller 91 displays a setting screen and the like, for example. The setting unit 92 performs a setting of the plug-in 70. The communication unit 93 performs a data communication with an outside. The storage unit 95 stores data of various kinds such as settings.

Figure 4:
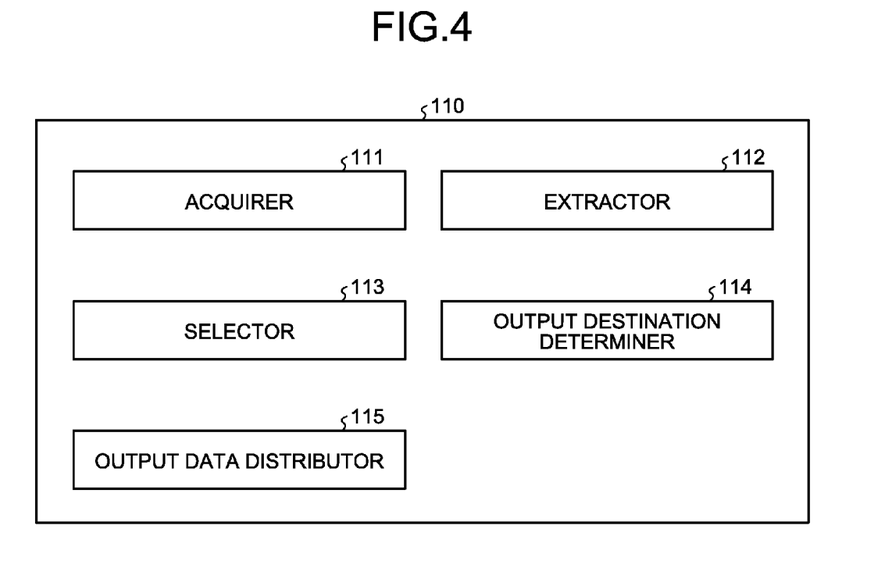
FIG. 4 illustrates an example of functions included in the print flow plug-in according to the embodiment.

Next, a specific content of the print flow plug-in 110 will be explained. FIG. 4 illustrates an example of functions included in the print flow plug-in according to the embodiment. As illustrated in FIG. 4, the print flow plug-in 110 is provided with an acquirer 111, an extractor 112, a selector 113, an output destination determiner 114, and an output data distributor 115.

When receiving a request for printing the print data, the acquirer 111 acquires a print time and date (output time and date) of the print data. Specifically, the acquirer 111 extracts, from the print data, the print time and date written at a specified position of the print data, for example. In the embodiment, the acquirer 111 extracts, from the intermediate print data passed by the virtual printer driver 50, the print time and date embedded by the request receiver 40 at the specified position. In this case, the time and date written in the output data becomes the print time and date.

The print time and date may be configured to be acquired by other methods. For example, when receiving the request for printing the print data, the acquirer 111 acquires a time and date when the print request is received as the print time and date. In this case, the time and date when the print request is received becomes the print time and date.

The extractor 112 detects and extracts, from the print data, a keyword (a predetermined string of letters) written in the text or at the predetermined position of the print data. Here, there is a condition that determines an output device as an output destination of the print data and the condition according to the embodiment is that a predetermined keyword is included in the print data. In other words, when a predetermined keyword is included in the print data, it means that the condition is satisfied. In the embodiment, strings of letters such as "surgical department", "internal medicine department", and "department of digestive organs" are listed each as the keyword, for example.

The selector 113 refers to selection information to select a scenario based on the acquired print time and date and sets the selected scenario as a scenario that determines an output device as the output destination. Here, the selection information is used for selecting a scenario corresponding to the print time and date. Besides, the scenario, which is information used for determining the output device as the output destination of the print data when the request for printing the print data is received, indicates a distribution condition of the print data. The selection information and the scenario correspond to correspondence information. The details of the selection information and the scenario will be explained below.

Figure 5:
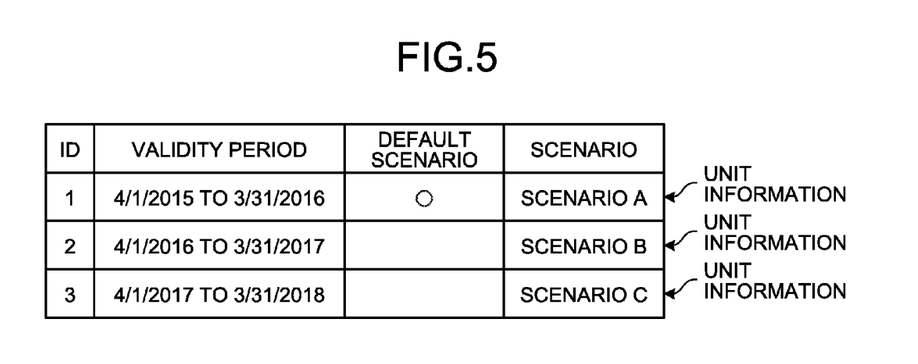
FIG. 5 illustrates an example of selection information.

First, the selection information will be explained. FIG. 5 illustrates an example of the selection information. The selection information illustrated in FIG. 5 is constituted by three pieces of unit information corresponding, on a one-on-one basis, to three scenarios (scenarios A, B, and C). In each piece of unit information of the selection information, an ID that identifies the unit information, a validity period, a judgement on whether or not the scenario is a default scenario, and the scenario are associated. The validity period indicates a period during which the corresponding scenario is available. The judgement on whether or not the scenario is a default scenario indicates whether or not the scenario among the plurality of scenarios registered in the selection information is a preset scenario at that time. FIG. 5 illustrates a case where the scenario A is the default scenario and the fact that the scenario A is the default scenario is indicated by a circle mark "O".

When unit information corresponding to the scenario A is focused, the ID included in the unit information corresponding to the scenario A is "1" and the validity period during which the scenario A is available is "Apr. 1, 2015 to Mar. 31, 2016". The scenario A is the default scenario.

Similarly, when unit information corresponding to the scenario B is focused, the ID included in the unit information corresponding to the scenario B is "2" and the validity period during which the scenario B is available is "Apr. 1, 2016 to Mar. 31, 2017". The scenario B is not the default scenario.

Similarly, when unit information corresponding to the scenario C is focused, the ID included in the unit information corresponding to the scenario C is "3" and the validity period during which the scenario C is available is "Apr. 1, 2017 to Mar. 31, 2018". The scenario C is not the default scenario.

While pieces of unit information for three scenarios are registered in the selection information in FIG. 5, there is no limitation in the number of scenarios.

With reference to FIG. 4 again, the selector 113 refers to selected selection information, selects a scenario whose validity period includes the print time and date acquired by the acquirer 111, and sets the scenario as a scenario used for determining the output destination. For example, the selector 113 selects the scenario A whose validity period includes the print time and date from the selection information in FIG. 5 when the print time and date acquired by the acquirer 111 is "Oct. 21, 2015/16:05".

When the print time and date acquired by the acquirer 111 is not included in the validity period corresponding to any of the scenarios, the selector 113 selects the default scenario. For example, when the print time and date acquired by the acquirer 111 is "Mar. 31, 2015/12:00", the selector 113 selects the scenario A which is the default scenario since the print time and date is not included in any validity period in the selection information in FIG. 5. In this case, the default scenario (scenario A) is set previously.

Figure 6A:
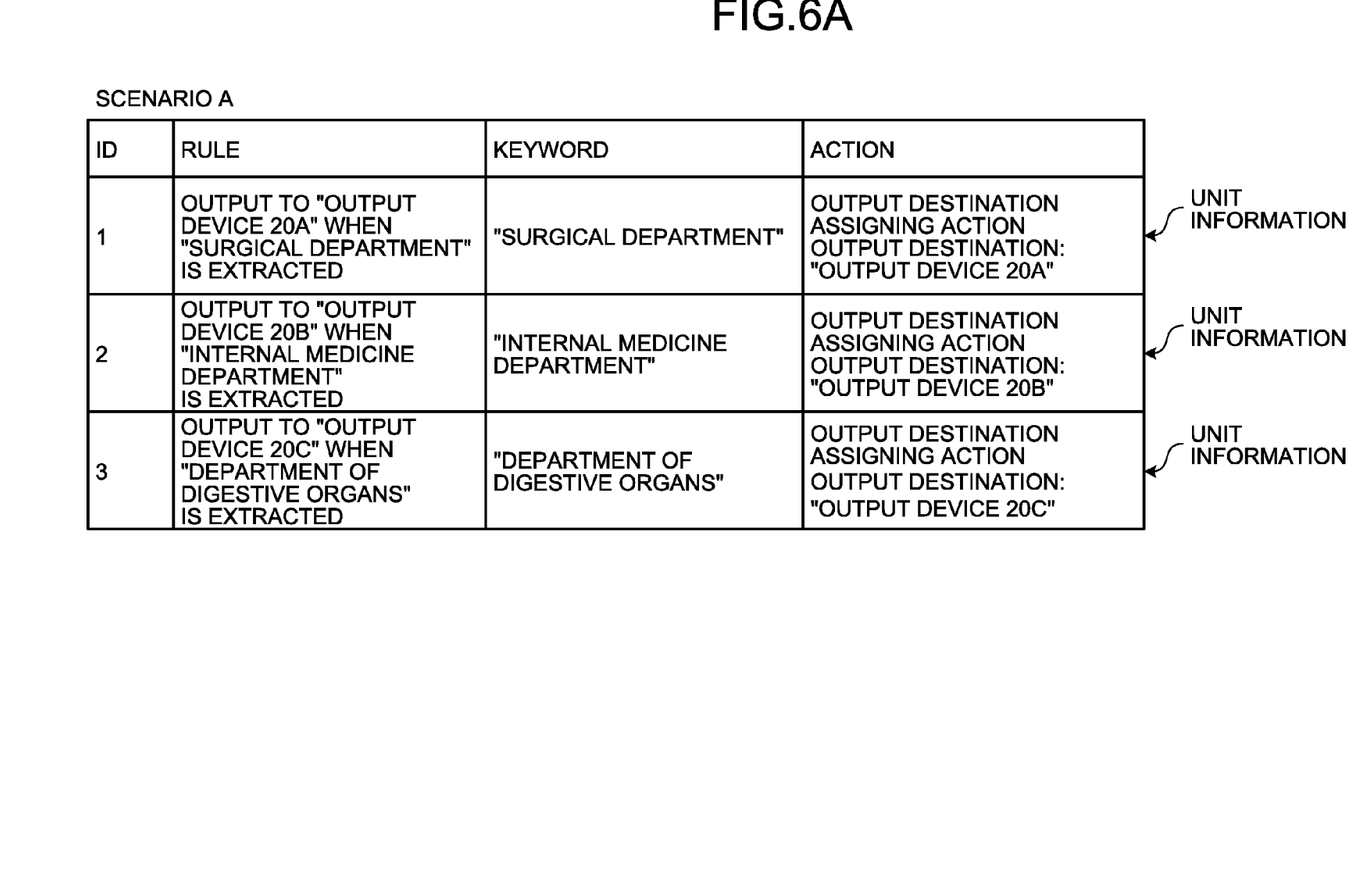
FIG. 6A illustrates an example of scenario.
Figure 6B:
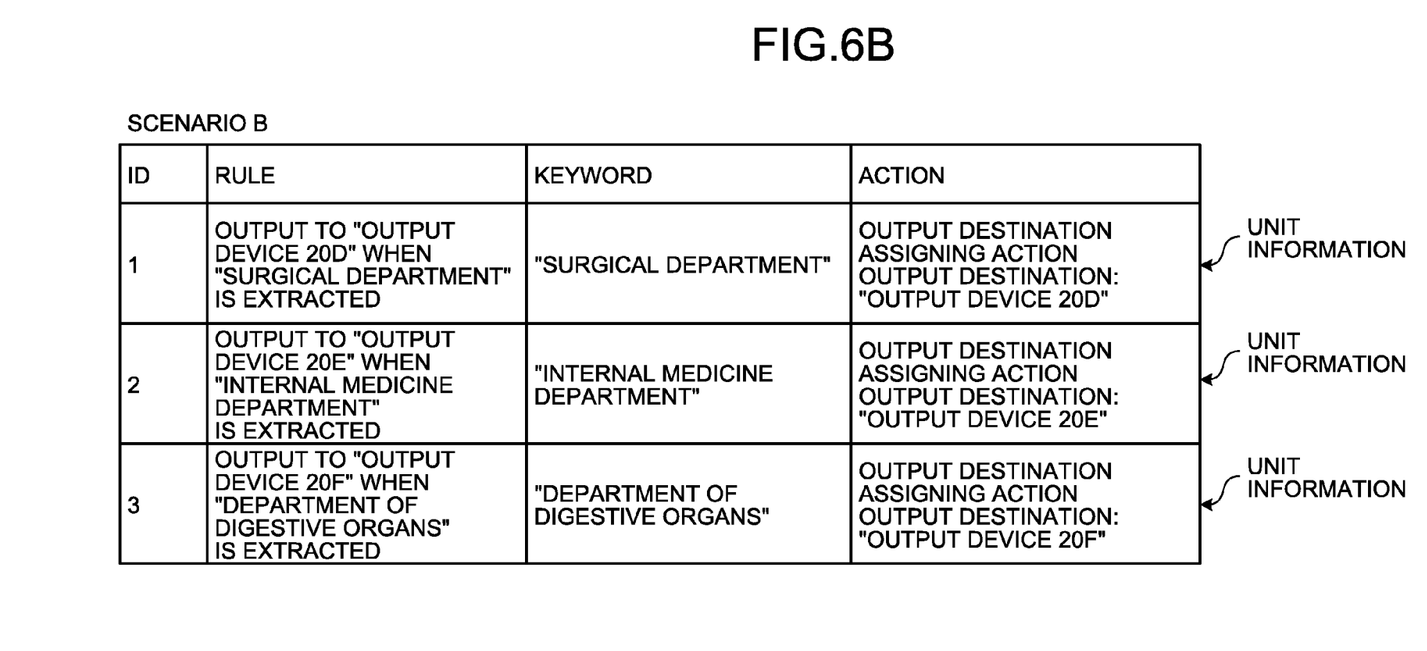
FIG. 6B illustrates another example of scenario.

Next, scenarios will be explained. FIGS. 6A and 6B illustrate examples of scenarios. In each of the scenarios illustrated in FIGS. 6A and 6B, each output device is associated with each condition that determines the output device as the output destination of the print data.

The scenario A illustrated in FIG. 6A includes three pieces of unit information corresponding, on a one-on-one basis, to three output devices (the output devices 20A, 20B, and 20C illustrated in FIG. 1). In each piece of unit information of the scenario, an ID that identifies the unit information, a rule, a keyword, and an action are associated. The keyword, which is a string of letters that allow the condition that determines the output device as the output destination of the print data to be satisfied, is written in the text of the print data, for example. The action indicates the output destination of the print data. The rule indicates a relation between the keyword and the action.

When unit information corresponding to the output device 20A is focused, the ID of the unit information corresponding to the output device 20A is "1". The condition of the unit information (condition that allows the rule to be satisfied) indicates that the keyword is the "surgical department". The action of the unit information indicates that the output destination is the "output device 20A". The rule of the unit information indicates outputting to the output device 20A when "surgical department" is detected.

Similarly, when unit information corresponding to the output device 20B is focused, the ID of the unit information corresponding to the output device 20B is "2". The condition of the unit information (condition that allows the rule to be satisfied) indicates that the keyword is the "internal medicine department". The action of the unit information indicates that the output destination is the "output device 20B". The rule of the unit information indicates outputting to the output device 20B when the "internal medicine department" is detected.

Similarly, when unit information corresponding to the output device 20C is focused, the ID of the unit information corresponding to the output device 20C is "3". The condition of the unit information (condition that allows the rule to be satisfied) indicates that the keyword is the "department of digestive organs". The action of the unit information indicates that the output destination is the "output device 20C". The rule of the unit information indicates outputting to the output device 20C when the "department of digestive organs" is detected.

The scenario B illustrated in FIG. 6B has the same configuration as the scenario A and includes three pieces of unit information corresponding, on a one-on-one basis, to three output devices (the output devices 20D, 20E, and 20F illustrated in FIG. 1). The explanation of the details will be omitted here since being the same as the scenario A.

In this manner, when it is desired to change the scenario to execute depending on the time and date, the validity period is determined for each of the plurality of scenarios in advance, the scenario is switched over depending on the print time and date, the output device to which the print data is output is determined depending on the scenario, and the print data is distributed to the determined output device. Here, the selection information and the scenarios are stored in an arbitrary storage place, and may be stored in the storage unit 95 or retained in the print flow plug-in 110, for example. Moreover, the selection information and the scenarios may be stored in an external device via the network 30, the print time and date and the keyword may be transmitted to the external device when the print request is received, and the determined scenario may be obtained.

The output destination determiner 114 determines the output device as the output destination of the print data based on the scenario selected by the selector 113 and the print data. Specifically, the output destination determiner 114 refers to the scenario selected by the selector 113 when the keyword that allows the condition to be satisfied is included in the print data, and determines the output device corresponding to the keyword extracted by the extractor 112 as the output destination. When the extracted keyword is the "surgical department" and the selected scenario is the scenario A (FIG. 6A) in the embodiment, the output destination determiner 114 determines the output device 20A corresponding to the "surgical department" as the output destination of the intermediate print data passed by the virtual printer driver 50.

The output data distributor 115 distributes the output data to the output device 20 determined by the output destination determiner 114. In this example, the output data distributor 115 distributes the intermediate print data passed by the virtual printer driver 50 to the output device 20 determined as the output destination by the output destination determiner 114. The output data distributor 115 performs a control of outputting the print data from the output device 20 determined as the output destination by using the real printer driver 60.

Figure 7:
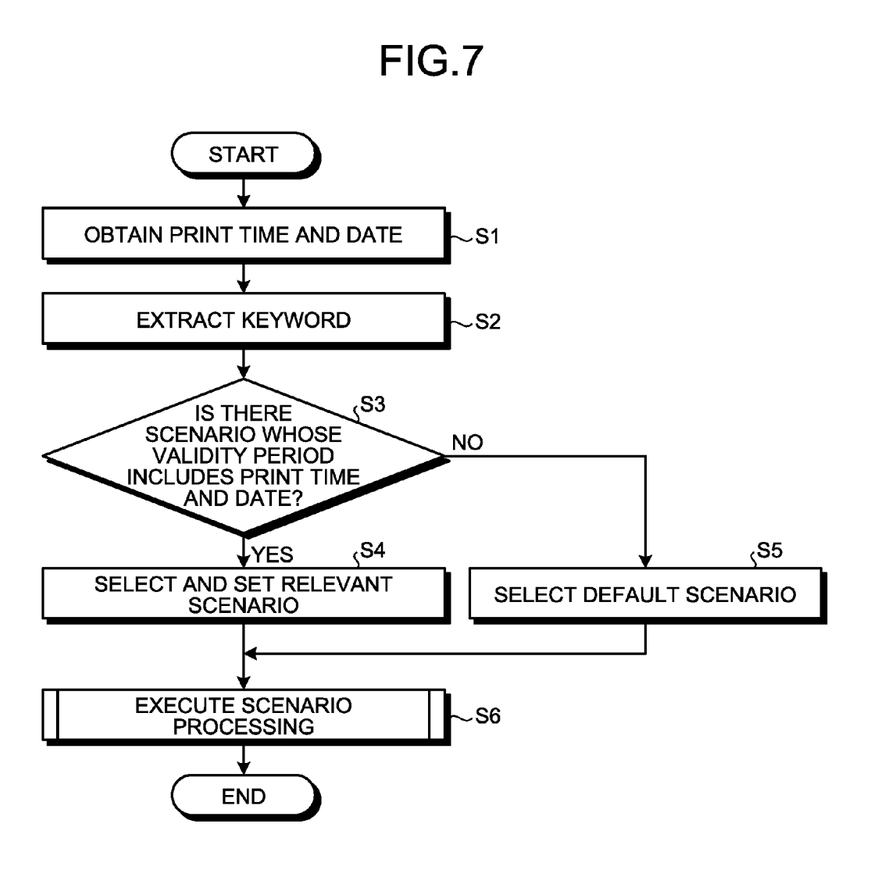
FIG. 7 is a flowchart of a scenario selection processing.

Next, a scenario selection processing will be explained. FIG. 7 is a flowchart of a scenario selection processing.

As illustrated in FIG. 7, first when the print request is received by the request receiver 40, the acquirer 111 acquires the print time and date embedded by the request receiver 40 in the print data from the intermediate print data passed by the virtual printer driver 50 (step S1). While the print time and date is acquired by extracting the time and date embedded in the print data in FIG. 7, the time and date when the print request is received may be acquired as the print time and date as explained above.

The extractor 112 then detects and extracts the keyword written in the text or at the predetermined position of the intermediate print data from the intermediate print data (step S2). The selector 113 refers to the selection information to determine whether or not there is a scenario whose validity period includes the acquired print time and date (step S3). When there is a scenario whose validity period includes the print time and date ("Yes" at step S3), the corresponding scenario is selected from the selection information and set as a scenario used for determining the output destination (step S4).

On the other hand, when there is no scenario whose validity period includes the print time and date ("No" at step S3), the default scenario is selected (step S5). In this case, the default scenario is configured to be set previously. A scenario processing by which the intermediate print data is distributed to the output destination is executed depending on the selected scenario (step S6).

Figure 8:
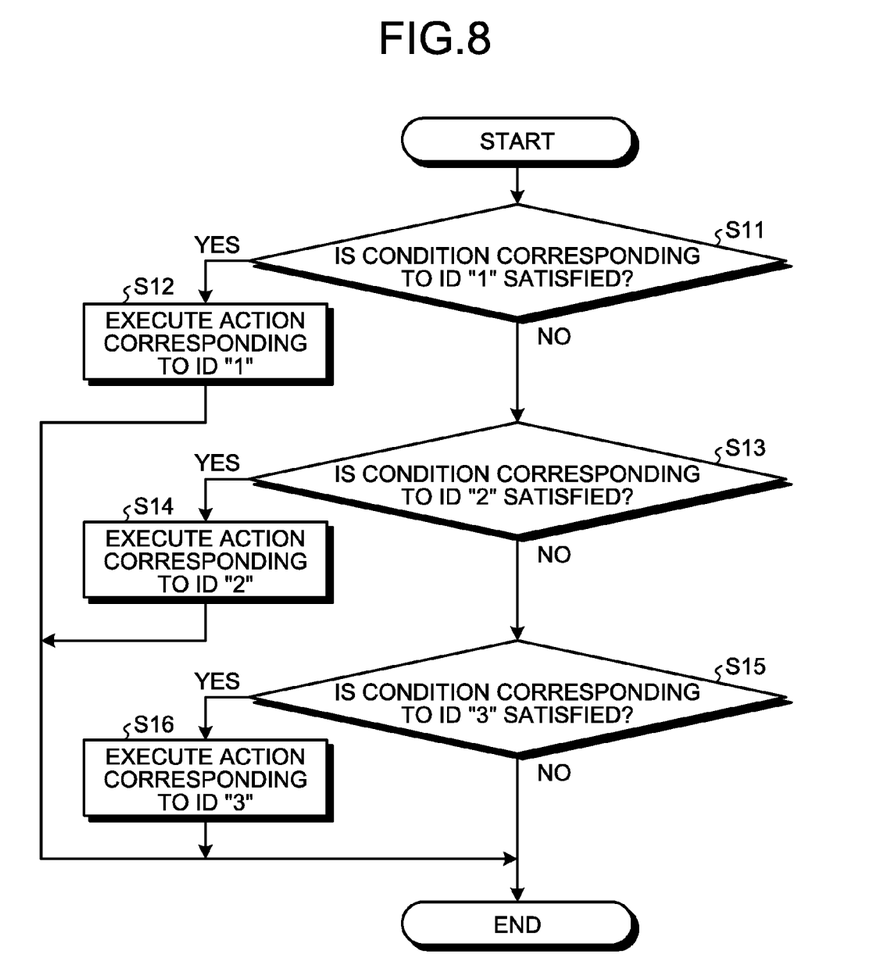
FIG. 8 is a specific flowchart of a scenario processing.

Next, a specific flow of the scenario processing will be explained. FIG. 8 is a specific flowchart of the scenario processing. The output destination determiner 114 of the print flow plug-in 110 determines the output destination of the print data depending on the scenario selected by the selector 113. In FIG. 8, a scenario processing in the case where the scenario A illustrated in FIG. 6A is selected will be explained.

As illustrated in FIG. 8, the output destination determiner 114 determines whether or not the extracted keyword is the keyword indicated by the ID "1", i.e., whether or not the condition corresponding to the ID "1" is satisfied (step S11). Specifically, in the case of the scenario A, the output destination determiner 114 determines whether or not the keyword extracted by the extractor 112 corresponds to the keyword "surgical department" that determines the output device 20A as the output destination.

When the result at step S11 is in the affirmative ("Yes" at step S11), the print flow plug-in 110 executes the action corresponding to the ID "1" (step S12). Specifically, in the case of the scenario A, the output destination determiner 114 determines the output device 20A as the output destination of the intermediate print data passed by the virtual printer driver 50. The output data distributor 115 then distributes the intermediate print data to the output device 20A and performs a control of outputting the real print data from the output device 20A by using the real printer driver 60.

When the result at step S11 is in the negative ("No" at step S11), the output destination determiner 114 determines whether or not the extracted keyword is the keyword indicated by the ID "2", i.e., whether or not the condition corresponding to the ID "2" is satisfied (step S13). Specifically, in the case of the scenario A, the output destination determiner 114 determines whether or not the keyword extracted by the extractor 112 corresponds to the keyword "internal medicine department" that determines the output device 20B as the output destination.

When the result at step S13 is in the affirmative ("Yes" at step S13), the print flow plug-in 110 executes the action corresponding to the ID "2" (step S14). Specifically, in the case of the scenario A, the output destination determiner 114 determines the output device 20B as the output destination of the intermediate print data passed by the virtual printer driver 50. The output data distributor 115 then distributes the intermediate print data to the output device 20B and performs a control of outputting the real print data from the output device 20B by using the real printer driver 60.

When the result at step S13 is in the negative ("No" at step S13), the output destination determiner 114 determines whether or not the extracted keyword is the keyword indicated by the ID "3", i.e., whether or not the condition corresponding to the ID "3" is satisfied (step S15). Specifically, in the case of the scenario A, the output destination determiner 114 determines whether or not the keyword extracted by the extractor 112 corresponds to the keyword "department of digestive organs" that determines the output device 20C as the output destination.

When the result at step S15 is in the affirmative ("Yes" at step S15), the print flow plug-in 110 executes the action corresponding to the ID "3" (step S16). Specifically, in the case of the scenario A, the output destination determiner 114 determines the output device 20C as the output destination of the intermediate print data passed by the virtual printer driver 50. The output data distributor 115 then distributes the intermediate print data to the output device 20C and performs a control of outputting the real print data from the output device 20C by using the real printer driver 60.

As explained so far, a scenario whose validity period fits is selected from the selection information based on the print time and date acquired by the acquirer 111 when the print request is received, and the output device 20 as the output destination of the print data (output data) is determined based on the selected scenario and the keyword extracted from the print data in the print system according to the embodiment. In other words, respective validity periods are set in advance with respect to a plurality of scenarios and a scenario whose validity period includes the print time and date acquired when the print request is received is selected to determine the output destination of the print data in the print system according to the embodiment. It is thus possible in assigning the output destination of the print data to switch over to a desired scenario and print the print data without a manual switching of scenario that determines the output destination of the output data.

Besides, while the print time and date is acquired by the acquirer 111 and the scenario whose validity period includes the acquired print time and date is selected in the embodiment, anything other than the time and date may be acquired. In other words, a print date of whatever time may be acquired and a scenario whose validity period includes the print date may be selected. Alternatively, only a time may be set in each scenario for the validity period, a print time of whatever time and date may be acquired, and a scenario whose validity period includes the acquired print time may be selected. In this case, it is possible to switch over between output devices to use respectively in the morning and in the early evening and to distribute the print date, for example.

Here, the print time and date, the print date, the print time, and the like are treated inclusively as a print time point.

While the embodiment of the present invention is explained so far, the present invention is not intended to limit directly to the embodiment and can be embodied by modifying the constituent elements at a practical phase without departing from the scope of the invention. Various inventions can be formed in an arbitrary combination of the plurality of constituent elements disclosed in the embodiment. For example, some constituent elements may be eliminated from all the constituent elements disclosed in the embodiment.

Programs to be executed in the client terminal 10 according to the embodiment is provided by being recorded in a file of an installable format or of an executable format in a computer-readable recording medium such as a CD-ROM, a flexible disk (FD), a CD-R, and a DVD (Digital Versatile Disc), as a computer program product.

The programs to be executed in the client terminal 10 according to the embodiment may be provided by being stored on a computer connected to a network such as the Internet and downloaded via the network. The programs to be executed in the client terminal 10 according to the embodiment may be provided or distributed via a network such as the Internet. The programs to be executed in the client terminal 10 according to the embodiment may be provided by being preloaded in a ROM and the like.

The programs to be executed in the client terminal 10 according to the embodiment has a module configuration including the units explained above (the acquirer, the selector, the extractor, the output destination determiner, and the output data distributor) and, as an actual hardware, the units are configured to be loaded and generated on a main storage device when the CPU (processor) reads out from the storage medium and executes the programs. Besides, a part or all of the functions of the units explained above may be realized by a dedicated hardware circuit, for example.

According to the embodiment, there is an advantage in that a switching to a desired condition can be performed in assigning an output destination of output data without a manual switching, by a user, of a condition that determines the output destination.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus connected to a plurality of output devices, comprising:
   at least one memory including computer readable instructions;
   at least one processor configured to execute the computer readable instructions to,
      receive an output request for outputting output data;
      refer to correspondence information select a condition based on a validity period associated with the condition, the correspondence information, and an output time point, the correspondence information including a plurality of conditions including the condition, each of the plurality of conditions being associated with one of a plurality of validity periods including the validity period, each of the plurality of validity periods indicating a period during which one of the plurality of conditions is valid, the output request being received at the output time point of the output data, the condition indicating an output device among the plurality output devices as an output destination if the output data includes a predetermined string of letters;
      determine an output device among the plurality of output devices as the output destination of the output data based on the condition and the output data, if the output data includes the predetermined string of letters; and
      distribute the output data to the output device.

2. The information processing apparatus according to claim 1, wherein
   the output time point is an output time and date of the output data, and
   the at least one processor is further configured to acquire, from the output data, the output time and date written at a specified position of the output data.

3. The information processing apparatus according to claim 1, wherein
   the output time point is a time and date when the output request for outputting the output data is received, and
   the at least one processor is further configured to acquire, when the output request is received, the time and date when the output request is received as an output time and date.

4. The information processing apparatus according to claim 1, wherein the at least one processor is further configured to extract, from the output data, the predetermined string of letters included in the output data.

5. The information processing apparatus according to claim 1, wherein
   a preset condition among the plurality of conditions is associated with an effect, the effect being that the preset condition is a default condition in the correspondence information, and
   the at least one processor is configured to select the default condition when the output time point is not included in the validity period of any of the plurality of conditions.

6. An information processing method performed in an information processing apparatus connected to a plurality of output devices, the information processing method comprising:
   receiving an output request for outputting output data;
   referring to correspondence information including a plurality of conditions, each of the plurality of conditions being associated with one of a plurality of validity periods, each of the plurality of validity periods indicating a period during which one of the plurality of conditions is valid;
   selecting a condition based on a validity period associated with the condition, the correspondence information, and an output time point, the output request being received at the output time point, the condition being one of the plurality of conditions, and the validity period being among the plurality of validity periods, the condition indicating an output device among the plurality output devices as an output destination if the output data includes a predetermined string of letters;
   determining the output device as the output destination of the output data based on the condition and the output data, if the output data includes the predetermined string of letters; and
   distributing the output data to the output device.

7. The information processing method according to claim 6, wherein
   the output time point is an output time and date of the output data, and
   the information processing method further comprises acquiring, from the output data, the output time and date written at a specified position of the output data.

8. The information processing method according to claim 6, wherein
   the output time point is a time and date when the output request for outputting the output data is received, and
   the information processing method further comprises acquiring, when the output request is received, the time and date when the output request is received as an output time and date.

9. The information processing method according to claim 6, further comprising extracting, from the output data, the predetermined string of letters included in the output data.

10. The information processing method according to claim 6, wherein a preset condition among the plurality of the conditions is associated with an effect that the preset condition is a default condition in the correspondence information, and the selecting includes selecting the default condition when the output time point is not included in the validity period of any of the plurality of conditions.

11. An output system comprising
a plurality of output devices; and
an information processing apparatus connected to the plurality of output devices, the information processing apparatus including,
   at least one memory including computer readable instructions,
   at least one processor configured to execute the computer readable instructions to,
     receive an output request for outputting output data,
     refer to correspondence information and select a condition based on a validity period associated with the condition, the correspondence information, and an output time point, the correspondence information including a plurality of conditions including the condition, each of the plurality of conditions being associated with one of a plurality of validity periods, the plurality of validity periods including the validity period, each of the plurality of validity periods indicating a period during which one of the plurality of conditions is valid, the output request being received at the output time point of the output data, the condition indicating an output device among the plurality output devices as an output destination if the output data includes a predetermined string of letters,
     determine an output device among the plurality of output devices as the output destination of the output data based on the condition and the output data, if the output data includes the predetermined string of letters, and
     distribute the output data to the output device.

* * * * *